United States Patent [19]

Lee

[11] 4,151,016

[45] Apr. 24, 1979

[54] SINGLE COMPONENT BRAZING PASTE

[75] Inventor: Irene W. H. Lee, Willoughby, Ohio

[73] Assignee: Fusion Incorporated, Willoughby, Ohio

[21] Appl. No.: 897,718

[22] Filed: Apr. 19, 1978

Related U.S. Application Data

[63] Continuation of Ser. No. 724,331, Sep. 17, 1976, which is a continuation-in-part of Ser. No. 625,655, Oct. 24, 1975.

[51] Int. Cl.$^2$ .............................................. B23K 35/34
[52] U.S. Cl. .......................................... 148/24; 148/23
[58] Field of Search ..................................... 148/24–26

[56] References Cited

U.S. PATENT DOCUMENTS

| 2,403,110 | 7/1946 | Miller | 148/24 |
| 2,493,372 | 1/1950 | Williams | 148/24 |
| 2,914,435 | 11/1959 | Wasserman | 148/24 |
| 3,149,007 | 9/1964 | Chamer | 148/24 |
| 3,321,829 | 5/1967 | Scott | 148/24 |

Primary Examiner—P. D. Rosenberg
Attorney, Agent, or Firm—Teare, Teare & Sammon

[57] ABSTRACT

A single component brazing paste suitable for brazing aluminum and having excellent shelf-life consists essentially of a mixture of (A) from 7 to 35, preferably at least 10, weight percent of a non-aqueous substantially inert vehicle which has a viscosity at room temperature in the range of 30,000 to 100,000 centipoises and which at brazing temperature is capable of volatilization and/or decomposition without leaving a residue, (B) from 18 to 75, preferably at least 25, weight percent of certain brazing fluxes suitable for use in brazing aluminum and containing no metals in free or combined form having a more negative or less positive oxidation potential than aluminum, (A) and (B) when mixed together having a viscosity at room temperature greater than the viscosity of (A) alone and in the range of 80,000 to 250,000 centipoises, and (C) from 15 to 75 percent weight of a particulate aluminum base alloy filler metal such that the mixture of (A), (B) and (C) has a viscosity at room temperature in the range of 200,000 to 1,000,000 centipoises. Preferably, the weight ratio of (B) to (A) is from 1:1 to 3:1. Also the preferred weight ratio of (B) to (C) is less than 1:1, more preferably no greater than about 0.8:1.

A preferred simple brazing flux for this brazing paste consists essentially, by weight, of 20 to 24% lithium chloride, 31 to 38% potassium chloride, 21 to 25% sodium chloride, 5 to 6.5% strontium chloride and 13 to 16% trisodium aluminum hexafluoride.

11 Claims, No Drawings

SINGLE COMPONENT BRAZING PASTE

CROSS-REFERENCE TO RELATED APPLICATION

This application is a continuation of my pending application, Ser. No. 724,331, filed Sept. 17, 1976 which is a continuation-in-part of U.S. application Ser. No. 625,655 filed Oct. 24, 1975.

BACKGROUND OF THE INVENTION

Brazing consists of joining base metal surfaces by fusing a filler metal having a lower melting point than the subject base metal without appreciable fusion of the base metal surfaces themselves. For brazing, a flux must be applied to the subject base metal surfaces either prior to or simultaneously with the filler metal. A satisfactory brazing flux flows at a temperature somewhat below the melting point of the filler metal; adheres to or wets the base metal surfaces; facilitates the flow and wetting of the filler metal over the subject base metal surfaces generally by reducing the surface tension of the molten filler metal; removes any oxide coating or other adherent foreign matter present on the subject base metal surfaces without appreciably attacking the base metal surfaces; inhibits re-oxidation of the subject base metal surfaces; and is capable of ready displacement by liquid filler metal either leaving no residue or leaving a readily removable relatively inert residue after completion of the brazing.

The problems attendant brazing light metals such as aluminum and aluminum alloys are particularly onerous because of the adherent and resistant oxide film on aluminum surfaces and because of the relatively low melting point of aluminum as a base metal making necessary the use of lower melting filler metals which are unsuitable for use with high-temperature fluxes. Consequently, the principal area of research has been in the area of new fluxes. One of the early solutions to the flux problem in light metal brazing was set forth in U.S. Pat. No. 2,299,168. Variations in fluxes have appeared in U.S. Pat. Nos. 2,507,346 and 2,552,105. However, recent variations in brazing technique described in U.S. Pat. Nos. 3,667,111 and 3,694,899 show that a completely satisfactory solution has not yet been found.

Of particular interest is U.S. Pat. No. 2,403,110 which describes a brazing paste for joining aluminum surfaces. The brazing paste comprises a mixture of a filler metal, a flux and a vehicle. The filler metal is an aluminum base alloy which melts at a temperature lower than the temperature of the aluminum surfaces or aluminum alloy surfaces to be brazed and can be an aluminum-silicon alloy with or without minor additions of other alloying elements such as zinc, cadmium or tin. The filler metal should be in the form of discrete particles, preferably not much larger than will pass a 50 mesh screen and preferably such that no more than 10 to 20 percent will pass through a 200 mesh screen. The flux is described as generally composed of 50 or more precent of alkali metal chlorides with 50 or less percent of alkali metal fluorides, there being no mention as to whether or not any of said components is anhydrous. The only specifically disclosed flux is composed of 20 weight percent lithium chloride, 36 weight percent potassium chloride, 25 weight percent sodium chloride, 6 weight percent strontium chloride, 1 weight percent potassium fluoride and 12 weight percent trisodium aluminum hexafluoride. The vehicle is described as non-aqueous and capable of volatilizing or othrwise leaving the paste at the brazing temperature and is specifically set forth as a glycol or glycol ether which is liquid at 20° C. and which evaporates without carbonizing. About 10 to 20 percent by weight of the total paste is vehicle, and the balance is flux and filler metal in a weight ratio between 5:1 and 1:1, preferably 3:1. The specific brazing paste described is too dry to be a paste as described and claimed herein, and its viscosity cannot be measured with the equipment employed herein. Even when the amount of vehicle in this paste is trebled, the viscosity of the resulting paste is over 1,000,000 centipoises.

Some brazing pastes heretofore found suitable for brazing light metals have had one particular drawback, namely, poor shelflife as determined by flux activity. When some prior art fluxes are wetted by a liquid vehicle or binder, there is a gradual loss in fluxing action apparently by interreaction of the chlorides and fluorides, and wet shelf-life is limited to about one week at most. When filler metal is included with the flux and vehicle is in a pre-mixed or single component brazing paste, shelf life is further reduced.

Another problem in the preparation of brazing pastes for light metals has been finding a suitable paste combination which on standing remains a uniform mixture rather than separating, which is suitably fluid to be ejected from an orifice to the surfaces to be brazed and which is sufficiently non-fluid to stay where put until brazing can take place.

The principal object of this invention is to provide a single component or pre-mixed brazing paste which is suitable for use in brazing aluminum and which has excellent chemical and physical shelf life. Another object of this invention is to provide novel fluxes which are suitable for use in aluminum brazing pastes and which when wet have shelf-lives of at least six months, even in the presence of filler metal. These objects as well as others which are apparent from the following description are satisfied by this invention.

SUMMARY OF THE INVENTION

This invention comprises a single component brazing paste suitable for brazing aluminum, having excellent shelf life and having a viscosity at room temperature in a range of 200,000 to 1,000,000 centipoises, said paste being a mixture consisting essentially of (A) from 7 to 35, preferably at least 10, weight percent of a non-aqueous vehicle which is substantially inert to the other components of said mixture, which has a viscosity at room temperature in the range of 30,000 to 100,000 centipoises and which at brazing temperature is capable of volatilization and/or decomposition without leaving a residue, (B) from 18 to 75, preberably at least 25, weight percent of a brazing flux suitable for use in brazing aluminum, none of the metal elements of which are below aluminum in the electromotive series of metals, said vehicle (A) and flux (B) in a mixture having a viscosity at room temperature greater than the viscosity of (A) alone and in the range of 80,000 to 250,000 centipoises, and (C) from 15 to 75 weight percent of a particulate aluminum base alloy filler metal fine enough to pass through a 60 mesh screen, said alloy containing at least 83 weight percent aluminum.

This invention also comprises several novel brazing fluxes, the simplest being 20 to 24 weight percent lithium chloride, 31 to 38 weight percent potassium chloride, 21 to 25 weight percent sodium chloride, 5 to 6.5 weight percent strontium chloride and 13 to 16 weight percent trisodium aluminum hexafluoride, said components being substantially anhydrous.

DESCRIPTION OF THE PREFERRED EMBODIMENTS

The vehicle (A) must be non-aqueous and substantially inert to the other components of the brazing paste of this invention. The vehicle must have a jelly- or cream-like consistency sufficient to carry the other brazing paste components without significant separation on standing. Such consistency appears to be commensurate with a viscosity in the range of 30,000 to 100,000 centipoises, corresponding generally to Brookfield viscometer readings at 75° F. (Model HAF with TC spindle) of 3 to 10 at 2 rpm and 8 to 15 at 5 rpm. The viscosities must be as stated at about room temperature (68° F.) and preferably should not change so significantly with increasing temperature as to permit significant settling or separation of the other paste components until after application of the brazing paste to the surfaces of the pieces to be brazed.

The vehicle (A) must volatilize or decompose at brazing temperatures without leaving a residue but otherwise is a matter of choice. The vehicle can be a single compound or a mixture of compounds. Typical compounds for use as all or part of said vehicle indclude ethylene oxide polymers, polyacrylate polymers, polymethacrylate polymers, polyacrylonitrile polymers, polyethylene glycols and methyl ethers therof, and polyaliphatic hydrocarbons such as paraffins, olefins, olefinic copolymers and mixtures thereof. Generally, viscosity control is simpler with multiple-component vehicles.

The flux (B) of this invention must be suitable brazing flux as described above where the base metal surfaces to be brazed are aluminum surfaces and the brazing metal or filler metal is an aluminum base alloy having a melting point less than the base aluminum surfaces to brazed. For optimum shelf life of the brazing paste, the flux (B) should be free of metals in free or combined form which are below aluminum in the electromotive series of metals, i.e. which have a more negative or less positive oxidation potential than aluminum. These fluxes are generally mixtures of alkali metal chlorides and fluorides with or without other metal chlorides and fluorides, said other metals usually being alkaline earth metals although rare earth metals are also readily usable, but metal chlorides and fluorides which can react with each other or with the filler metal must be avoided. Suitable fluxes are known as stated and illustrated in U.S. Pat. No. 2,403,110. Obviously, the flux should be molten at the temperature of brazing. Another suitable flux of the same type is a mixture of 26 to 31 weight percent lithium chloride, 15 to 18 weight percent sodium chloride, 33 to 40 weight percent potassium chloride, 6 to 7 weight percent strontium chloride, 0.5 to 1.5 weight percent lithium fluoride, 5 to 6 weight percent sodium fluoride and 5 to 6.5 weight trisodium aluminum hexafluoride.

A particularly favored flux (B) for use in brazing paste of this invention is set forth above as a part of this invention. In this flux it is critical that the metal halides in the flux be substantially anhydrous because the presence of any water decreases the shelf life of the flux, especially when the flux is mixed with the vehicle with or without the filler metal. The preferred flux is composed of 22.4 weight percent anhydrous lithium chloride, about 34.7 weight percent anhydrous potassium chloride, about 23.0 weight percent anhydrous sodium chloride, about 5.7 weight percent anhydrous strontium chloride and about 14.2 weight percent dry trisodium aluminum hexafluoride.

The flux (B) should be such that when mixed with the desired vehicle (A) in the desired weight ratio the viscosity of the mixture at room temperature (68° F.) must be greater than the viscosity of (A) alone and in the range of 80,000 to 200,000 centipoises, corresponding generally to Brookfield viscometer readings at 75° F. (Model HAF with TC spindle) of 10 to 25 at 2 rpm and 20 to 40 at 5 rpm. Preferably, the weight ratio of (B) to (A) is in the range of about 1:1 to 3:1.

The single component brazing paste of this invention contains a filler metal (C) in addition to the vehicle (A) and the flux (B) described above. The brazing of aluminum normally requires the use of an aluminum base alloy as the filler metal. This alloy must melt at a temperature lower than the melting temperature of the aluminum base metal to be brazed. The most common aluminum base alloy filler metals are the aluminum-silicon alloys, the aluminum-copper alloys, the aluminum-zinc alloys and the aluminum-copper-zinc alloys. Other alloying elements can be included in such alloys for some special effect, usually to lower the melting point of a given alloy.

The preferred filler metals are the aluminum-silicon alloys, particularly those alloys containing at least 2, more preferably 4.5 to 13, weight percent silicon and at least 83 weight percent aluminum, other elements being selected from copper, iron, zinc, magnesium, manganese and chromium. Typical preferred alloys are identified and available commercially as AWS (American Welding Society) Classes BAlS-1, BAlS-2, BAlS-3, BAlS-4, and BAlS-5:

| AWS CLASS BAlS- | WT% OF ALLOYING ELEMENTS | | | | | | |
|---|---|---|---|---|---|---|---|
| | Si | Cu | Fe | Zn | Mg | Mn | Cr |
| 1 | 4.5–6.0 | 0.30 | 0.8 | 0.10 | 0.05 | 0.05 | — |
| 2 | 6.8–8.2 | 0.25 | 0.8 | 0.20 | 0.10 | — | — |
| 3 | 9.3–10.7 | 3.3–4.7 | 0.8 | 0.20 | 0.15 | 0.15 | 0.15 |
| 4 | 11.0–13.0 | 0.30 | 0.8 | 0.20 | 0.10 | 0.15 | — |
| 5 | 9.0–11.0 | 0.30 | 0.8 | 0.10 | 0.05 | 0.15 | — |

Single values are maximum percentages. The balance of each alloy is aluminum. These alloys have a preferred brazing range of about 1020° to about 1180° F.

The filler metal is used in particulate form, the size of the particles being a matter of choice. For commercial use especially with automated brazing equipment it is preferable that the filler metal particles be fine enough, i.e. less than 250 microns, to pass through a 60 mesh screen in order to make possible a smooth brazing paste. It is also preferable that the particles be such that no more than 30 to 40 percent of the filler metal particles pass through a 200 mesh screen and no more than 10 percent pass through a 325 mesh screen.

The relative proportions of vehicle (A), flux (B) and filler metal (C) can vary considerably within the defined limits. As little as 7 weight percent vehicle (A) can be used in brazing pastes, but from about 20 to 35 weight percent vehicle is preferred. As much as 75 weight percent flux (B) has been used in brazing pastes, but it is preferable to use less than 50 weight percent, more preferably from about 25 to 40 weight percent, flux in the brazing paste of this invention. Filler metals (C) can form as little as 15 to 20 weight percent and as much as 60 to 75 weight percent of brazing pastes, but it is preferable to use from about 40 to 60 weight percent filler metal in the brazing paste of this invention. Preferably, the weight ratio of flux (B) to filler metal (C) should be less than 1:1, more preferably no greater than 0.8:1.

The selection of (A), (B) and (C) both as to type and amount must be such that the final mixture at room temperature (68° F.) has a viscosity in the range of 200,000 to 1,000,000 centipoises, corresponding generally to Brookfield viscometer readings at 75° F. (Model HAF with TE spindle) of 5 to 20 at 2 rpm and 10 to 30 at 5 rpm.

Typical preferred embodiments of this invention employ a flux (B) which is a mixture, by weight, of 6.16 parts anhydrous lithium chloride, 9.57 parts anhydrous potassium chloride, 6.33 parts anhydrous sodium chloride, 1.58 parts anhydrous strontium chloride and 3.91 parts anhydrous trisodium aluminum hexafluoride. The typical preferred brazing pastes of this invention are mixtures by weight of about 27.5 parts of a vehicle (A) having Brookfield viscometer readings at 75° F. (Model HAF with TC spindle) of 6 at 2 rpm and 12 at 5 rpm, corresponding to a room temperature viscosity in the range of 48,000 to 60,000 centipoises, and consisting of a blend of a butadiene-isobutylene copolymer in a liquid paraffin, about 27.5 parts of the above flux (B), the mixture of (A) and (B) alone having Brookfield viscometer readings at 75° F. (Model HAF with TC spindle) of 18 at 2 rpm and 31 at 5 rpm, corresponding to a room temperature viscosity in the range of 120,000 to 180,000 centipoises, and about 45 parts of any of the above described AWS Class BA1S alloys as filler metals employed as particles smaller than 60 mesh of which about 88 weight percent are smaller than 100 mesh, about 33 weight percent are smaller than 200 mesh, and about 6 weight percent are smaller than 325 mesh, the total paste having Brookfield viscometer readings at 75° F. (Model HAF with TE spindle) of 10 at 2 rpm and 18 at 5 rpm, corresponding to a room temperature viscosity in the range of 360,000 to 500,000 centipoises. Such single component brazing pastes have shelf lives of at least six months with no sign of chemical or physical change and are excellent in brazing aluminum base metal parts together using either manual or mechanized techniques.

I claim:

1. A brazing paste suitable for brazing aluminum, having excellent shelf-life and having a viscosity at room temperature in the range of 200,000 to 1,000,000 centipoises, said paste being a mixture consisting essentially of (A) from 7 to 35 weight percent of a non-aqueous vehicle which is substantially inert to the other components of said mixture, which has a viscosity at room temperature in the range of 30,000 to 100,000 centipoises and which at brazing temperature is capable of volatilization and/or decomposition without leaving a residue, (B) from 18 to 75 weight percent of a brazing flux suitable for use in brazing aluminum, and substantially free of any metals in free or combined form below aluminum in the electromotive series of metals, said vehicle (A) and flux (B) in a mixture having a viscosity at room temperature greater than the viscosity of (A) alone and in the range of 80,000 to 250,000 centipoises, and (C) from 15 to 75 weight percent of a particulate aluminum base alloy filler metal fine enough to pass through a 60 mesh screen, said alloy containing at least 88 weight percent aluminum.

2. A paste in accordance with claim 1 wherein said paste contains at least 10 weight percent of vehicle (A) and at least 25 weight percent of flux (B).

3. A paste in accordance with claim 2 wherein said paste contains less than 50 weight percent flux (B) and at least 40 weight percent filler metal (C).

4. A plate in accordance with claim 3 wherein said paste contains 25 to 35 weight percent vehicle (A) and 25 to 40 weight percent flux (B).

5. A paste in accordance with claim 4 wherein the weight ratio of flux (B) to filler metal (C) is less than 1:1 and said vehicle (A) consists essentially of polyaliphatic hydrocarbons.

6. A paste in accordance with claim 5 wherein said vehicle (A) is a blend of a butadiene-isobutylene copolymer in a substantially paraffinic hydrocarbon.

7. A paste in accordance with claim 6 wherein said flux (B) is composed of 20 to 24 weight percent lithium chloride, 31 to 38 weight percent potassium chloride, 21 to 25 weight percent sodium chloride, 5 to 6.5 weight percent strontium chloride and 13 to 16 weight percent trisodium aluminum hexafluoride, said components being substantially anhydrous.

8. A paste in accordance with claim 6 wherein said flux (B) is composed of 26 to 31 weight percent lithium chloride, 15 to 18 weight percent sodium chloride, 33 to 40 weight percent potassium chloride, 6 to 7 weight percent strontium chloride, 0.5 to 1.5 weight percent lithium fluoride, 5 to 6 weight percent sodium fluoride and 5 to 6.5 weight percent trisodium aluminum hexafluoride, said components being substantially anhydrous.

9. A brazing paste suitable for brazing aluminum and having excellent shelf-life comprised of a mixture of (A) from 7 to 35 weight percent of a non-aqueous substantially inert vehicle which has a viscosity at room temperature in the range of 30,000 to 100,000 centipoises and which at brazing temperature is capable of volatilization and/or decomposition without leaving a residue, (B) from 18 to 75, weight percent of brazing fluxes suitable for use in brazing aluminum and containing no metals in free or combined form having a more negative or less positive oxidation potential than aluminum, (A) and (B) when mixed together having a viscosity at room temperature greater than the viscosity of (A) alone and in the range of 80,000 to 250,000 centipoises, and (C) from 15 to 75 weight percent of a particulate aluminum base alloy filler metal such that the mixture of (A), (B) and (C) has a viscosity at room temperature in the range of 200,000 to 1,000,000 centipoises, the weight ratio of (B) to (A) is from 1:1 to 3:1 and the weight ratio of (B) to (C) is less than 1:1.

10. The brazing paste in accordance with claim 9 wherein the brazing paste consists essentially, by weight, of 20 to 24% lithium chloride, 31 to 38% potassium chloride, 21 to 25% sodium chloride, 5 60 6.5% strontium chloride and 13 to 16% trisodium aluminum hexafluoride.

11. A brazing paste suitable for brazing aluminum and having excellent shelf-life comprised of a mixture of (A) from 7 to 35 weight percent of a substantially non-aqueous inert vehicle which has a viscosity at room temperature in the range of 30,000 to 100,000 centipoises and which at brazing temperature is capable of volatilization and/or decomposition without leaving an appreciable residue, (B) from 18 to 75, weight percent of brazing fluxes suitable for use in brazing aluminum and containing no metals in free or combined form having a more negative or less positive oxidation potential than aluminum, (A) and (B) when mixed together having a viscosity at room temperature greater than the viscosity of (A) alone and in the range of 80,000 to 250,000 centipoises, and (C) from 15 to 75 weight percent of a particulate aluminum base alloy filler metal such that the mixture of (A), (B) and (C) has a viscosity at room temperature in the range of 200,000 to 1,000,000 centipoises, the weight ratio of (B) to (A) is from 1:1 to 3:1 and said alloy containing a majority, by weight, of aluminum.

* * * * *

UNITED STATES PATENT AND TRADEMARK OFFICE
CERTIFICATE OF CORRECTION

PATENT NO. : 4,151,016
DATED : April 24, 1979
INVENTOR(S) : Irene W.H. Lee

It is certified that error appears in the above-identified patent and that said Letters Patent is hereby corrected as shown below:

Column 5:

Claim 1, line 68, "88" should read --83--;

Column 6:

Claim 10, line 55, "paste" should read --flux--; and

Claim 10, line 57, "5 60 6.5%" should read --5 to 6.5%--.

Signed and Sealed this

Tenth Day of November, 1992

*Attest:*

DOUGLAS B. COMER

*Attesting Officer*   Acting Commissioner of Patents and Trademarks